United States Patent [19]

Schroder et al.

[11] 3,955,133

[45] May 4, 1976

[54] APPARATUS FOR STABILIZATION OF ELECTRICAL POWER SUPPLY MAINS

[75] Inventors: Dierk Schroder, Mannheim; Dieter Grunberg, Viernheim, both of Germany

[73] Assignee: BBC Brown Boveri & Company Limited, Baden, Switzerland

[22] Filed: June 7, 1974

[21] Appl. No.: 477,470

[30] Foreign Application Priority Data
June 8, 1973 Germany............................ 2329287

[52] U.S. Cl.................................. 323/50; 323/86; 323/102; 323/119
[51] Int. Cl.² ........................................... G05F 3/00
[58] Field of Search ................... 323/24, 50, 85, 86, 323/102, 106, 108, 109, 110, 119, 120, 121, 127, 128

[56] References Cited
UNITED STATES PATENTS

| | | | |
|---|---|---|---|
| 2,632,862 | 3/1953 | Stoltz................................. | 323/86 X |
| 3,022,426 | 2/1962 | Kusko............................... | 323/109 X |
| 3,295,053 | 12/1966 | Perrins.............................. | 323/24 X |
| 3,487,287 | 12/1969 | Demarest................................ | 321/9 |
| 3,551,799 | 12/1970 | Koppelmann.................... | 323/127 X |
| 3,609,515 | 9/1971 | Babcock et al................... | 323/24 X |
| 3,740,638 | 6/1973 | Thorborg......................... | 323/127 X |
| 3,754,184 | 8/1973 | Stone............................... | 323/119 X |

FOREIGN PATENTS OR APPLICATIONS

| | | | |
|---|---|---|---|
| 1,141,143 | 3/1957 | France................................. | 323/50 |

Primary Examiner—William M. Shoop
Attorney, Agent, or Firm—Pierce, Scheffler & Parker

[57] ABSTRACT

Apparatus for stabilizing the effects of single or multi-phase electrical power consumers with greatly fluctuating loads on the power supply mains in which the primaries of single or multi-phase leakage reactance transformers are connected in parallel with the consumer load. The secondaries of these transformers are short-circuited for each phase by means of a regulator at any time desired in functional relation to changes in the consumer load as determined by a measuring device.

16 Claims, 5 Drawing Figures

APPARATUS FOR STABILIZATION OF ELECTRICAL POWER SUPPLY MAINS

The invention concerns an apparatus to stabilize the effects of single- or multi-phase consumers with greatly fluctuating loads on the associated supply main.

There are various methods known to compensate the reactive power load and to balance the unbalanced factors of supply main loads.

In many instances there are employed rotating phase converters (synchronous machines) for the compensation of variable reactive power loads. However, this solution has the following disadvantages:

1. excessive space requirements as well as engineering outlays,
2. compensation is feasible only for a symmetrical reactive power load, and
3. the limited dynamics (controlling time approximately 100 ms). The restriction of the compensation to a purely symmetrical reactive load can be overcome by the use of a second synchronous machine which is counter-revolving and is provided with two field windings which are offset electrically by $\pi/2$. The technical outlay of this solution is particularly excessive.

Another known arrangement for the compensation of symmetrical reactive power loads consists of a main-fed converter-regulating organ and an inductance as the load. Since only the low d.c. voltage can drop across the inductance in proporation to the ohmic drop, the converter-regulating organ must function approximately at the operating point, median output voltage of zero, corresponding to an angle of control $\alpha = \pi/2$. Any slight change in the angle of control $\alpha$ will change, under this specific set-up, the median output voltage of the regulating organ, and thus the current within the power leads of the regulating organ.

This arrangement functions as a variable inductive load with efficient dynamics, since the controlling time is approximately 5 to 10 ms. The converter-regulator has the disadvantage however, that it can provide only inductive reactive power for the supply main to be compensated, thus requiring always an additional battery of condensers for the compensation of the cos $\phi$ in the supply main. There is the additional disadvantage that the supply main to be compensated is subjected to harmonic oscillations, and the battery of condensers is therefore tuned to the essential harmonics of the converter-regulator (harmonic absorbers). Still another disadvantage of this converter-regulator is due to the inductance as the load. If the permissible controlling range of a few degrees (1° el = 55.6 $\mu$s) is being exceeded in direction of rectifying operation due to a failure of the signal-processing unit, an overload will be created automatically, causing a break-down of the system. Therefore, the converter-regulator requires additional devices for protection against overloads and break-downs.

Other known methods of compensation are a method using saturated chokes and the so-called ZDB network.

In the case of the method using saturated chokes there is established a constant voltage at the consumer by means of the specific design of the chokes. When the consumer voltage exceeds a predetermined value, the chokes become saturated and the extra current of the chokes will cause a voltage drop through the supply main impedance.

The ZDB network is analogous to the method employing a converter-regulator but there is no need for a battery of condensers because there is present a forced commutation of the values so that angles of control $\alpha < 0°$ become feasible. The ZDB network is limited to the compensation of symmetrical reactive power loads.

It is the object of the invention to overcome the above discussed disadvantages, and to create an apparatus of the above-described type for the purpose of balancing unbalanced active power loads of supply mains, and to compensate, if necessary, the reactive power load.

This objective is accomplished by the invention in that manner that there is connected to the consumer in parallel, a single- or multi-phase leakage reactance transformer, known per se design-wise, and that the secondaries of this transformer can be short-circuited at each phase by means of a controllable semiconductor valve type of regulator at any time desired in functional relation to changes in consumer loads as determined by a measuring device.

It will be advantageous to design the apparatus in such manner that the primary feeder voltage can be converted by the leakage reactance transformer into a voltage of relatively low magnitude, to be switched by the regulator, and that the leakage reactance transformer serves simultaneously to generate an inductive current component.

Other advantageous species of the object of the invention are set forth in the subsidiary claims.

The invention will be explained in detail in conjunction with the accompanying drawings wherein.

Figure 1:
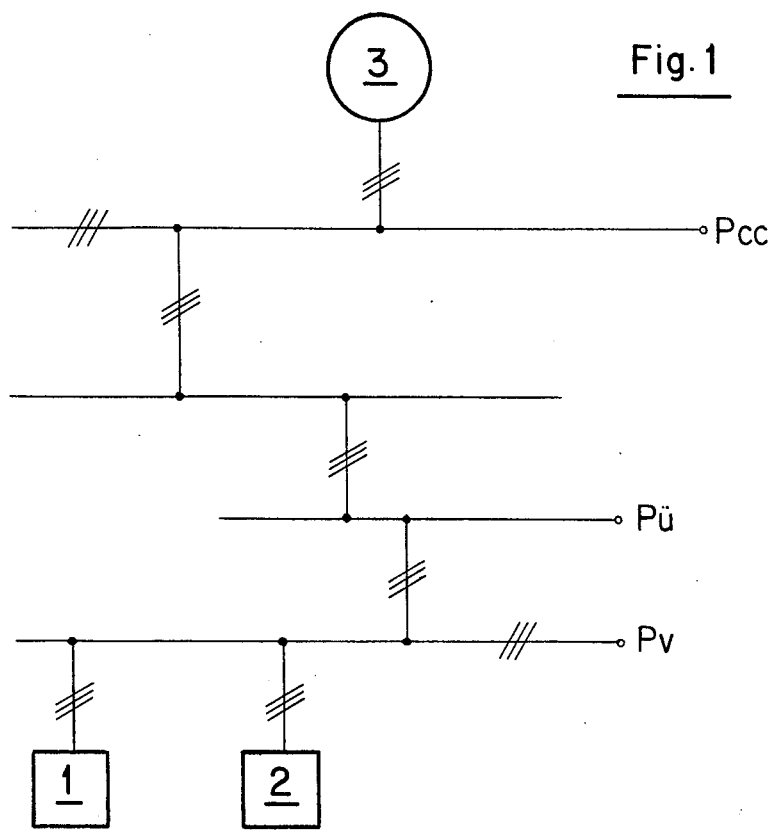
FIG. 1 depicts the supply main with the consumer and the stabilizing apparatus.

In FIG. 1 the a three-phase consumer is denoted by numeral 1, its energy intake from the supply main 3 fluctuating greatly, for example, in the case of an arc furnace load. The load 1 is connected at a point Pv to a line of the interconnected system, said line intercommunicating by way of a cross-connection with the line containing point Pu. The line containing point Pu intercommunicates, in turn, by way of another cross-connection with another line which is cross-connected by a cross-connection to the line containing point Pcc. The supply network 3 is directly connected to this latter line. This will lead to great voltage variations at point Pcc, detrimentally affecting other consumers connected to Pcc, evidenced, for example, by the flickering of light bulbs in lighting circuits connected to Pcc.

It is therefore important to avoid, if possible, any voltage fluctuations at point Pcc, and to maintain a predetermined power factor at point Pü. This is to be attained by means of a stabilizing apparatus 2 which is connected to the consumer in parallel by the line Pv.

Figure 2:
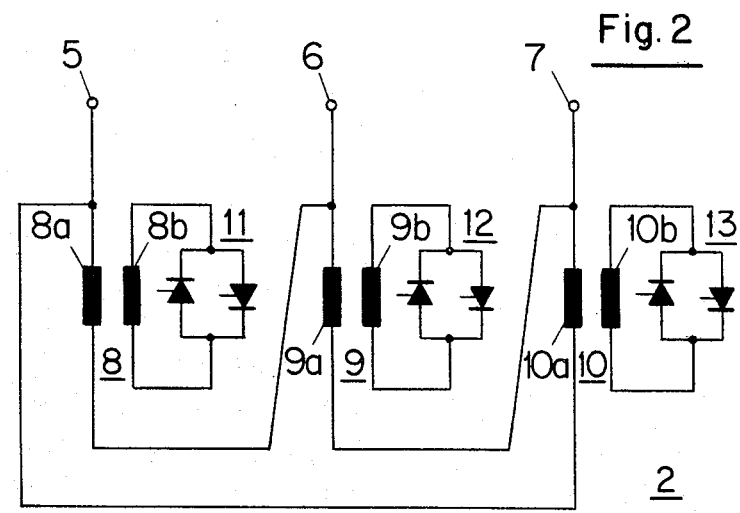
FIG. 2 shows a network of the stabilizing apparatus.

The network of the stabilizer 2 is shown in detail by FIG. 2.

Figure 3:
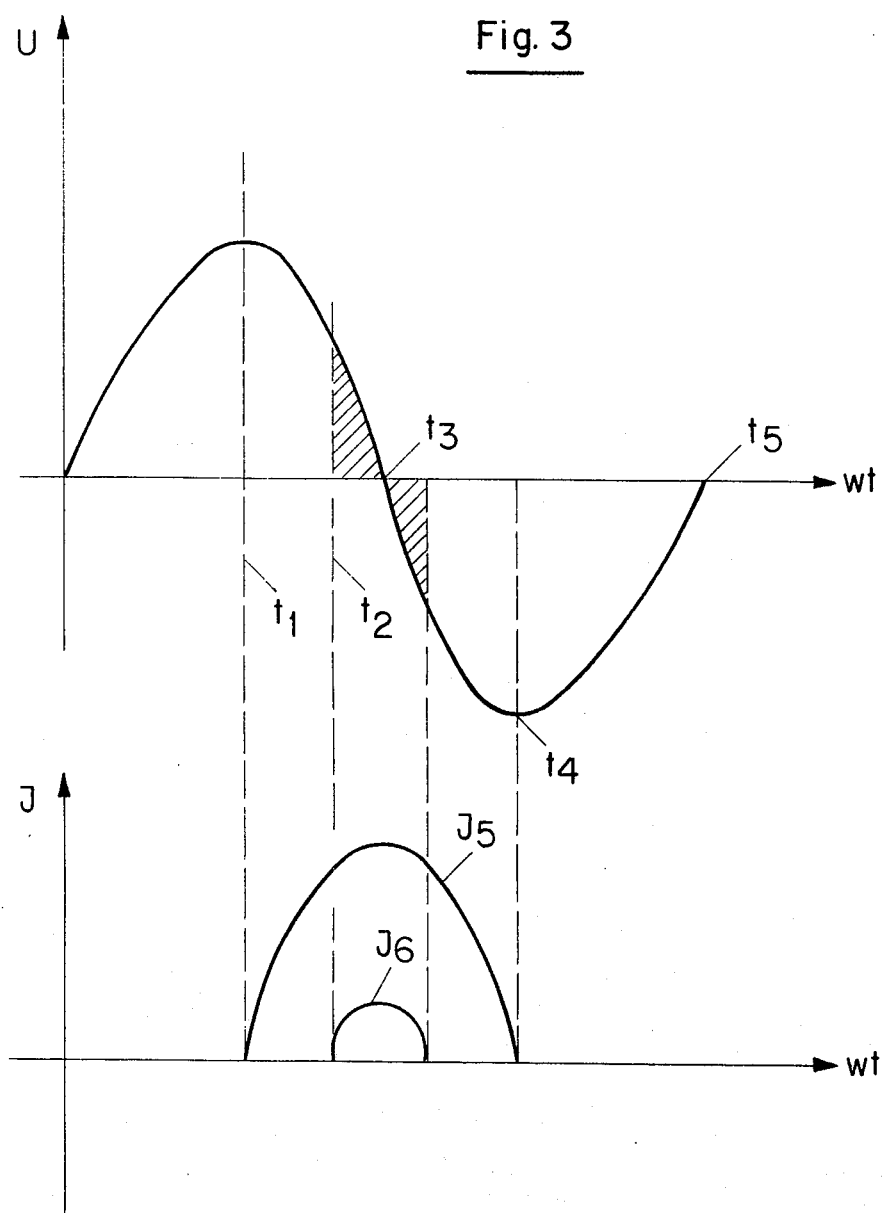
FIG. 3 is a graph which illustrates the operation of the stabilizing apparatus.

The stabilizing apparatus 2 is connected to the consumer 1 in parallel by way of terminals 5, 6, 7, a three-phase consumer in the example shown. The terminals 5, 6, 7 lead to three leakage reactance transformers 8, 9, 10, and the primary windings 8a, 9a, 10a of these transformers can be switched potential-free, or, if required, independently from each other in accordance with one of the known groupings. The secondary windings 8b, 9b, 10b can be short-circuited in either direction by the associated regulators 11, 12, 13. Th controlled valves of each regulator are connected anti-parallel to each other. Each leakage reactance transformer possesses a high leakage inductance ($u_{k\%}$ = 100 percent) and transforms the high voltage at the primary side to a lower voltage, compatiable with the regulator. They act as an inductance, inducing a phase shift between current and voltage, but at the same time also act as voltage transformers. FIG. 3 explains the method of operation of the regulator control. U denotes the secondary voltage, J the secondary current of one of the leakage reactance transformers shown by FIG. 2., or of a device applicable for single-phase consumers. When the regulator is turned on at the time $t_1$, a strong short-circuit current J5 is being generated. When the regulator is turned on at a later time, for example, about time $t_2$, the current will always be weaker than J5, in the graph shown as J6. By a selective switching within a time period ranging from $t_1$ to $t_3$ it becomes possible to set the secondary short-circuit current infinitely variable from a maximum value down to zero. This applies correspondingly to the controlled valve, connected anti-parallel, from the time $t_4$ up to the time of the subsequent positive voltage maximum.

Figure 4:
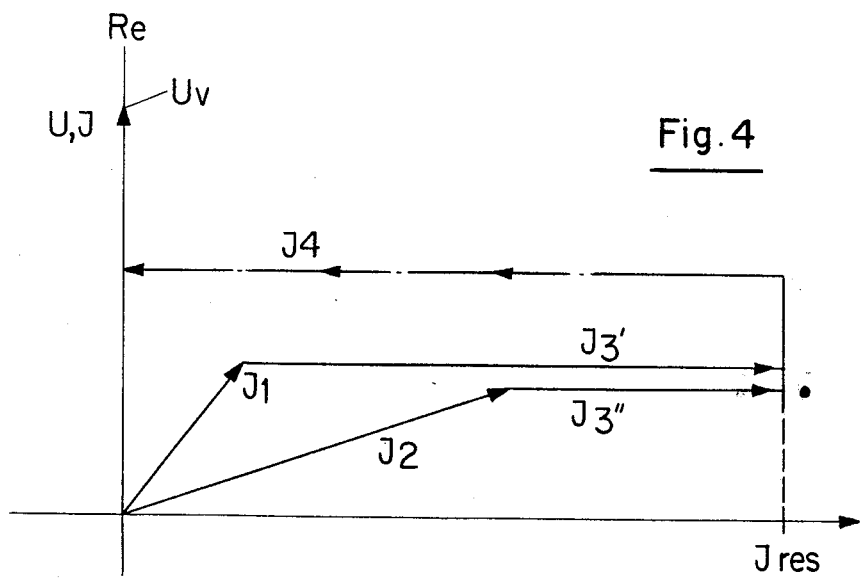
FIG. 4 is a vector diagram of the currents which arise.

In FIG. 4, the symbol $U_v$ denotes the voltage across the consumer 1 as well as the stabilizing apparatus. By the setting of a current $J_{res}$, which will be constant for each load of the consumer 1, there is produced an always constant voltage $U_v$ within the supply mains. If the current of the consumer has a low value of $J_1$, the short-circuit $J'_3$, of the regulator will be set at a relatively great value (for example $J_6$ in FIG. 3). If the current of the consumer suddenly rises to the value $J_2$, the regulator, or regulators respectively, are set to the lower short-circuit current $J_3''$, by means of control devices which are known per se.

Figure 5:
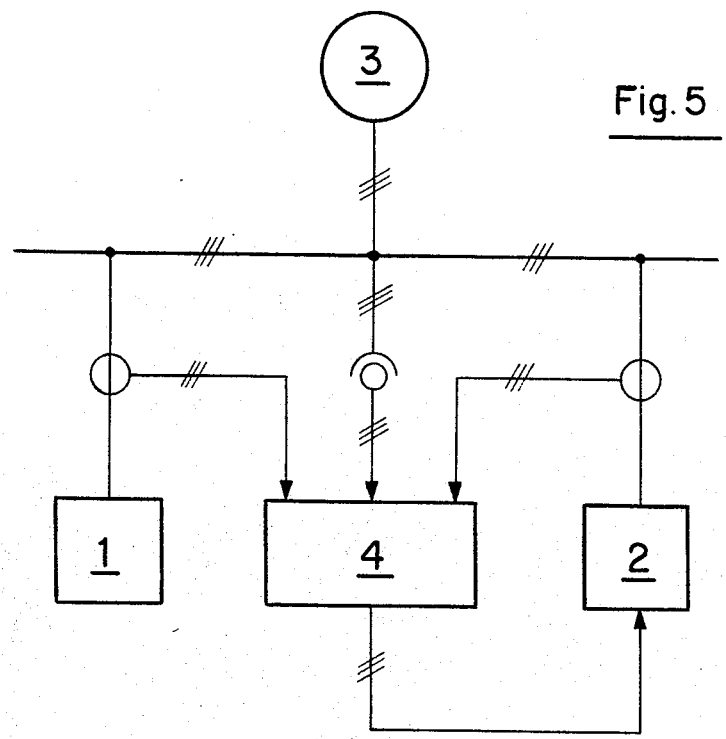
FIG. 5 shows the consumer, stabilizing apparatus and the control device.

By the addition of a battery of condensers C1, C2 and C3 with switching means S S2 bnd S3, generating a current $J_4$, it is possible to set the power factor at a predetermined value by the adjustment of the regulator current. The control device is shown diagrammatically by FIG. 5. The c irrent of consumer 1, the short circuit current at the stabilizing apparatus 2 which is a function of the angle of control of the regulators, and also the voltage are all fed into the control device 4 by measuring systems known per se, which in turn influences the controllers in apparatus 2 by way of controlling units known per se. The measuring system is, in an advantageous manner installed within the control device 4.

The transformers shown by FIG. 2 can be constructed by use of one single three-phase transformer with heavy leakage and three single-phase controllers. Such three-phase transformer with heavy leakage is similar design-wise to a transformer for feeding arc furnaces, its secondary windings matching the voltage requirements of the three-phase regulator, and acting at the same time as a choke due to its marked leakage inductances. During the time periods when there are no pulses activating the valves of the regulator, only the primary inductance of the transformer will be effective, and the primary currents of the apparatus are so low that they can be disregarded. On the other hand, when all valves of the regulators are open, currents will flow through the primary side of the transformer which are governed only by the voltage applied and by the factor $u_{k\%}$ of the transformer.

For example, at $u_{k\%}$ = 100 percent of the leakage reactance transformer and at rated voltage, only the rated current of the compensator will flow, and the overload problem is thus controlled easily.

The currents of the compensator can be varied infinitely by changing the angle of control of the regulators; a change in the same direction of the control angle of the regulator valves results in variable symmetric compensator currents, while such change in the opposite direction results in variable unbalanced compensator currents. In contrast to methods which employ switched chokes, where in accordance with the load conditions chokes of various gradations, or several chokes of identical gradations are additionally connected, the apparatus proposed by the invention matches a load condition by varying the time expanse ("Zeitflaeche") of the voltage at the leakage inductances of the leakage reactance transformer. This variation of the time expanse of the voltage is accomplished by giving activating commands to the valves of the regulator at diverse points of time within the range of control by the regulators. Since the activating commands can be varied infinitely within the range of control, it is thus possible to match the load condition smoothly.

Furthermore, the specific range of control reduces in an advantageous manner the sensitivity of the apparatus to stray pick-ups by the signal-processing unit. Also, the dynamics of the apparatus are improved in comparison with methods using switched reactances because in case of load changes the apparatus proposed by the invention can respond more rapidly due to the great number of specific controls.

Another advantage of this method is due to the fact that the valves of a regulator need to cut off at the maximum the secondary voltage of the supply main, and not the double maximum voltage of the supply main 3, as in the case of the method using switched condensers (see FIG. 1).

Another advantage of the new apparatus over methods using switching of chokes is due to the handling of signals. If during the continuous addition of chokes the connection is not being accomplished at the voltage maximum, it will not be possible to avoid d.c. components within the choke current. This problem does not exist in the case of the new apparatus because only one current direction is opened at one time, with the instant of cut-in at, or after the voltage maximum; this means a remagnetizing with a voltage time expanse related to the instant of cut-in, which is being removed again after zero voltage (FIG. 3). Since the negative voltage time expanse during the demagnetizing must, due to the losses, always be smaller than the positive voltage time expanse during remagnetizing, the current will become zero even prior to the negative voltage maximum, and will remain zero. This applies also correspondingly to the voltage time expanse, beginning at the negative voltage maximum. A valve is only activated when the other valve of a regulator ceases to carry any current.

The new apparatus can easily be modified to solve various problems. If at a balanced load the cos $\phi = 1$, or if the longitudinal voltage drop requires compensation, it is feasible to divide the compensation apparatus into two units with different transformer wirings. For example, the primary windings of one leakage reactance transformer can be delta-connected, and the second transformer Y-connected. Such combination will substantially reduce the harmonic content of the compensator currents. It will furthermore improve the dynamics of the entire system because two partial units, which are electrically 30° out of phase, are operating in unison.

This combination can be employed advantageously even if the load is split into one balanced portion and one unbalanced portion. However, if the load cannot be separated into balanced portion, the primary windings of the leakage reactance transformer cannot be Y-connected and must be delta-connected.

In the following paragraphs there will be discussed some aspects of signal processing in connection with the new apparatus.

This apparatus, comprising a leakage reactance transformer and current regulators, has the dynamic characteristics of a pulse-phase modulated system which is more efficient dynamically than a pulse-amplitude modulated system.

The dynamic characteristics of the compensator are controlled not only by the dynamics of the regulator element but also by the dynamic properties of the measuring data control. The known systems, comprising switched condensers, or chokes respectively, usually employ for the purpose of measuring, data control integrators which are synchronized with the supply main and are clocked. Therefore, the output signal of the integrators represents a measure for the supply main conditions only at certain instants of time. The clocked measuring data control is well suited for methods employing switched reactances which are also clocked. This measuring data control can also be employed in connection with systems using a leakage reactance transformer and three-phase regulators. It is the main disadvantage of the system described above that measuring results are available only at certain points in time while the apparatus proposed by the invention requires continuous and, if possible, harmonic-free signals for processing, in order to make full use of the dynamic advantages of the regulating element. The problem of rapid and continuous measuring data control at low harmonic content is particularly important for the balancing and the compensating of unbalanced supply mains.

Generally, it can be stated that either the measuring time or the harmonic content of the measuring data are excessive. All these methods can be improved only by phase multiplication of the measuring data as such, followed by forming of the measuring data.

All compensating methods which balance and compensate have in common at least a transverse voltage drop across the impedances of the supply main, and in the case of incomplete compensation also a longitudinal voltage drop, either partially or entirely. For this reason the supply main and the consumer main will change their phase position relative to each other in case of load changes. This phase variation between consumer main and supply main will lead at constant control voltage (signal voltage) to an undesirable change in modulation of the regulating component if the impulse control unit processes only well filtered supply main voltages. It is therefore advantageous to employ an impulse control device which filters the supply main voltage at a lesser degree, or to use impulse control units based on the phaselocked principle with an additional, subsequent control, functionally related to the consumer voltage. This will also avoid any instabilities which may occur in the case of not too powerful mains.

The phase-locked principle applies to an activating impulse device where there exists a synchronizing connection with the supply main by means of a slow α control, with the result that this activating impulse device will operate satisfactorily regardless of phase and frequency variations within the supply main.

We claim:

1. Apparatus for stabilizing the effects of a single or multi-phase alternating current consumer having a greatly fluctuating load characteristic on the alternating current supply main to which the consumer is connected comprising a leakage reactance transformer, the primary winding of said transformer being connected to said alternating current supply main in parallel with said consumer, and the secondary of said transformer being short-circuitable through a controllable semiconductor valve type regulator, and means controlling the firing angle of said controllable semiconductor valves in accordance with the change in the consumer load thereby to correspondingly vary the amount of short circuit current flowing through said secondary winding.

2. Apparatus according to claim 1, the characteristics being that the primary feeder voltage is converted by the leakage reactance transformer into a voltage of relatively low magnitude, to be switched by the regulator, and that the leakage reactance transformer serves simultaneously to generate an inductive current component.

3. Apparatus according to claim 1 where the primary wiring and the secondary wiring of the primary and secondary windings of the leakage reactance transformer are potential-free relative to each other.

4. Apparatus according to claim 1, where the primary winding and the secondary winding of each leakage reactance transformer, independently from each other, can be interconnected in accordance with one of the known switching groupings.

5. Apparatus according to one of the claim 1 where by means of condensers, connected additionally in parallel with the single- or multi-phase consumer, the reactive power can be compensated at any degree desired.

6. Apparatus according to claim 5 where the condensers are designed in the form of fixed capacitor.

7. Apparatus according to claim 5, where the condensers can be connected and disconnected in groups in relation to loads of longer duration.

8. Apparatus according to one of the claim 1 where additionally the longitudinal voltage drop across the supply main impedances can be compensated as desired by actuating the regulators.

9. Apparatus according to one of the claim 1, the characteristics that there is assigned to each regulator valve a control range within the run of the voltage period of 90° el, and that during the switching on of the regulator there will not occur any d.c. component in the alternating current of the regulator.

10. Apparatus according to claim 9, where the regulator valve which is connected anti-parallel to the current-carrying valve can be activated only after the zero current at the current-carrying regulator valve.

11. Apparatus according to claim 1 where for the rapid and low-in-harmonic detection of the change in consumer load there is provided a measuring device.

12. Apparatus according to claim 11 where for the improvement in the dynamics of the stabilization process of the measuring device there is provided in front of such device a phase-multiplying network.

13. Apparatus according to claim 1 where there are provided for the control of the regulators impulse control units for supply-main-fed converters.

14. Apparatus according to claim 1 where in case of weak supply mains there are provided control units which operate according to the phase-locked method.

15. Apparatus according to claim 13 where there are provided additional inputs at the control units to compensate for manufacturing tolerances in the control of the leakage reactance transformers, such inputs to be loaded by constant impulses, dependent on the manufacturing tolerances.

16. Apparatus according to claim 14 the characteristics being that there is provided an additional measuring device which picks up the phase and frequency fluctuations within the supply main and which transmits a signal by means of which the control pulses for the regulator can be followed up, while the control units for the device influencing the regulators are not affected by this irregularity.

* * * * *